J. D. RODGERS.
FARM GATE.
APPLICATION FILED AUG. 6, 1913.
1,130,931.
Patented Mar. 9, 1915.
2 SHEETS—SHEET 1.
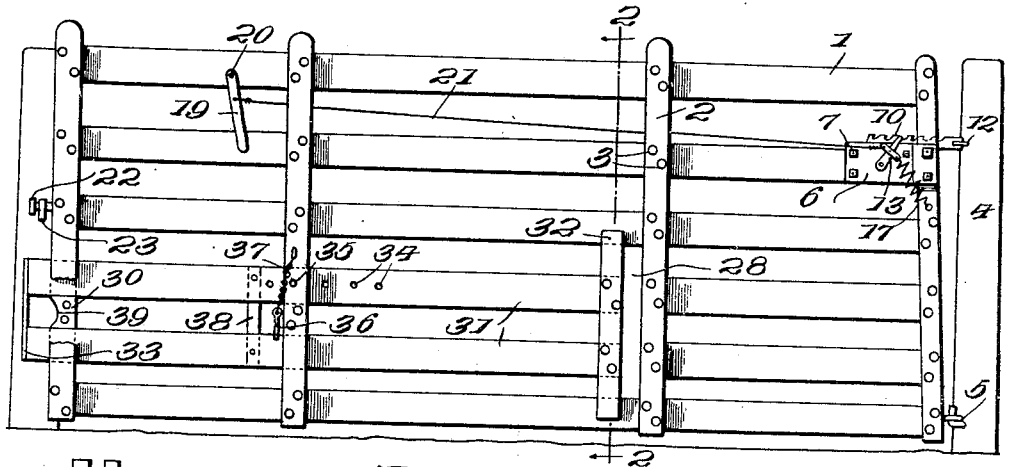
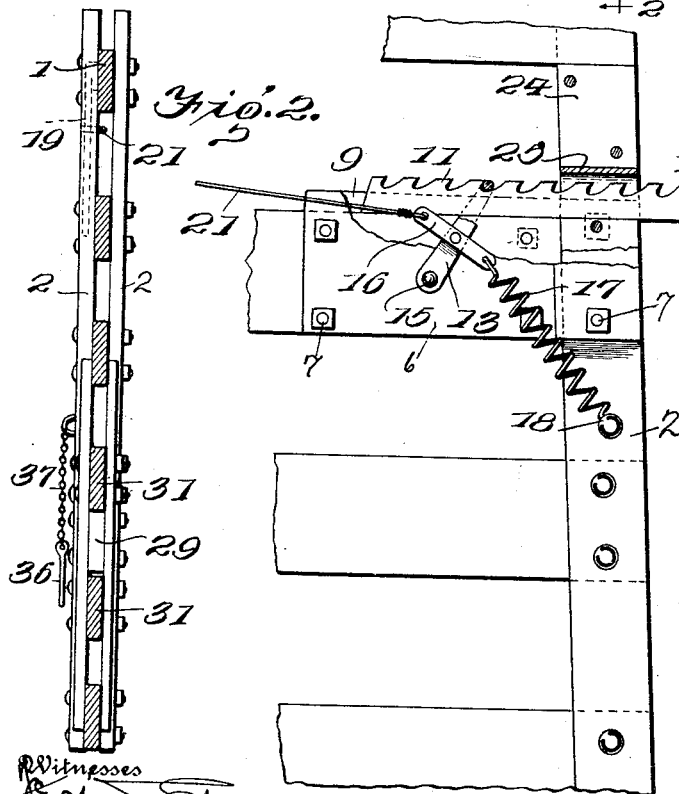
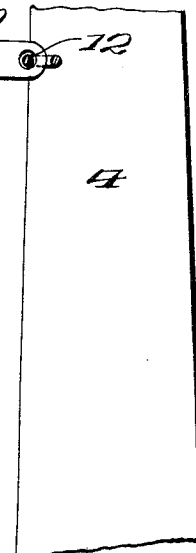
Inventor
J. D. Rodgers.

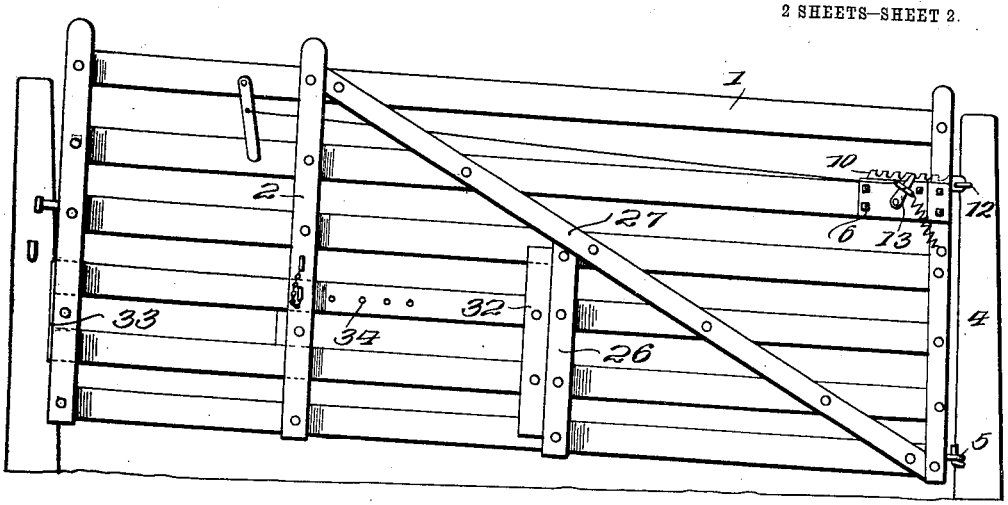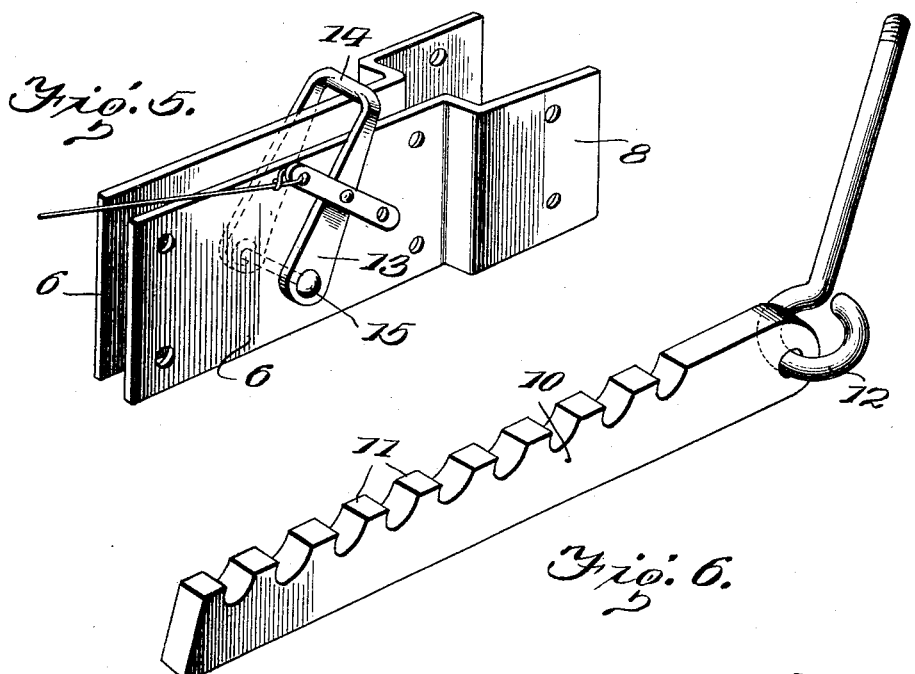

UNITED STATES PATENT OFFICE.

JAMES D. RODGERS, OF GEORGETOWN, KENTUCKY.

FARM-GATE.

1,130,931.   Specification of Letters Patent.   Patented Mar. 9, 1915.

Application filed August 6, 1913. Serial No. 783,434.

*To all whom it may concern:*

Be it known that I, JAMES D. RODGERS, citizen of the United States, residing at Georgetown, in the county of Scott and State of Kentucky, have invented certain new and useful Improvements in Farm-Gates, of which the following is a specification.

This invention relates to farm gates and has as its primary aim to provide means for mounting such a gate, the means being readily and conveniently adjustable to take up any sag in the gate, to compensate for any tilting of the hinge post of the gate, or to allow the gate to swing over ruts or other obstructions temporarily formed in the roadway.

The invention also aims to provide means for accomplishing the above-mentioned result, which means will be of such character as to obviate the necessity of pivotally or foldably connecting the panels and bars of the gate as is usually done when the result aimed at is to be secured.

The device embodying the present invention constitutes one of the hinges for the gate and as a consequence it serves both the purpose of a hinge and as a means for compensating for sagging of the gate and permitting the gate to be swung over obstructions in the road.

The invention further aims to construct the device so that sagging of the gate may be remedied by merely lifting the free or latch end of the gate upwardly the desired distance, the device acting automatically to support the gate in the position to which it is lifted and incidentally the invention contemplates the provision at the free or latch end of the gate, of means whereby the device may be temporarily rendered inoperative so as to permit of the gate being lowered after it has been closed.

The invention also aims to provide a device for accomplishing the results mentioned, which device may be readily applied to practically any ordinary farm gate with little trouble and without extensive alteration of the gate structure.

In the accompanying drawings: Figure 1 is a front elevation of a gate constructed in accordance with the present invention. Fig. 2 is a vertical transverse sectional view on the line 2—2 of Fig. 1. Fig. 3 is a detail view, in elevation, of the device embodying the present invention, parts being broken away and parts being shown in section. Fig. 4 is a view similar to Fig. 1 illustrating the application of the invention to a gate of a type different from that shown in Fig. 1. Fig. 5 is a perspective view of the locking bail of the device and its support. Fig. 6 is a perspective view of the keeper rack bar with which the locking bail coöperates.

In the drawings the gate is illustrated as consisting of rails 1 which, as usual, are arranged to extend horizontally and which are connected in spaced relation by means of pairs of bars or stiles 2. The bars 2 of each pair are disposed against the opposite sides of the rails 1 and are secured in place by means of bolts or other suitable fastening devices 3 secured through the bars and through the rails. By reference to Fig. 1 of the drawings it will be observed that the fastening devices 3 passing through the bars 2 and each of the rails 1 are out of vertical alinement and that, in fact, they are arranged in alinement on diagonal lines, their relative arrangement being alternately reversed along each of the rails 1. That set of the bars 2 located at the latch end of the gate and the intermediate sets of the bars are arranged in parallel relation but it will be observed by reference to Fig. 1 that the ends of the rails 1 at the hinged end of the gate are cut along a diagonal line and that as a consequence the bars of the set at this end of the gate incline upwardly and toward the next adjacent set of bars so that as a matter of fact the gate as a whole is of less length at its top than at its bottom.

The gate is mounted for swinging movement upon a hinge post indicated by the numeral 4, by means of an ordinary pintle and eye hinge 5 and by the device embodying the present invention as will be presently more specifically explained. The said device consists in parts of plates 6 which are secured by means of bolts or other suitable fastening elements 7 to opposite sides of one of the upper rails 1 of the gate at the hinged end thereof and which are provided with offset portions 8 which overlap and are secured to the pair of bars 2 at the hinged end of the gate and the upper edges of the plates 6 project above the upper edge of the rail 1 to which they are secured so as to form a guideway 9 slidably receiving the rack bar 10 which constitutes a keeper for a locking member carried by the gate, which locking member will be presently more specifically described. The rack bar 10 has its teeth 11 inclined in the direction of one end of the bar and the said end of the bar is pivotally connected with an eye bolt 12 which is secured in the hinge post 4. The point of pivotal engagement of the bar 10 with the eye bolt 12 is directly above the pintle and eye hinge 5 and the locking member above referred to is adapted to coöperate with the rack bar so as to connect the same adjustably with the gate as will be presently explained, so that by the provision of the said rack bar and eye bolt and pintle and eye hinge 5 the gate is hingedly supported for swinging movement about the post 4.

The locking member above referred to is in the nature of a bail having spaced side portions 13 and a connecting portion 14, the bail being disposed in position straddling the plates 6 and the rail to which these plates are secured, with its portion 14 extending above the guideway 9 and a pivot pin 15 is fitted through the lower ends of the spaced portions 13 of the bail and through the plates 6 and said rail 1. A cross piece 16 is secured upon one of the spaced portions of the bail and extends transversely thereof with its end portions projecting beyond the opposite sides of the said spaced portion. A spring 17 is connected to one end of the cross piece 16 and at its other end is secured to one of the bars 2 at the hinged end of the gate as indicated at 18. This spring serves to yieldably hold the connecting portion 14 of the bail in engagement with the teeth of the keeper rack bar 10 and by reason of this engagement of the bail with the rack bar the rack bar is connected with the gate and constitutes one of the hinge members for supporting the gate. In order that the bail may be swung out of engagement with the rack bar a hand lever 19 is pivotally mounted as at 20 upon one of the rails 1 and has connected to it one end of a rod or wire 21 which at its other end is connected to the cross piece 16.

From the foregoing description of the invention it will be readily understood that when it is desired to compensate for sagging of the gate or for tilting of the post 4 from its vertical position or when it is desired to allow the gate to clear obstructions temporarily in the roadway, the free end of the gate may be lifted, whereupon the tilting of the hinged end of the gate toward the hinge post 4 will result in a sliding movement of the rack bar 10 within the channel 9 during which movement the connecting portion of the bail will ride over the teeth of the rack bar and successively engage the same until the free end of the gate is released. It will be apparent, of course, that the distance to which the latch end of the gate is to be lifted will depend upon the amount of sag in the gate, or other existing conditions. When it is desired to lower the gate as for example, after it has been swung to closed position and it is desired to bring its latch into engagement with its keeper, indicated respectively in the drawings by the numerals 22 and 23, the latch end of the gate may be slightly lifted and the lever 19 then swung in the direction of this end of the gate. This movement of the lever will result in the bail being rocked upon the pivot pin 15 thereby bringing its connecting portion out of coöperative relation with the keeper rack bar 10. The pressure against the lever being maintained the gate is then allowed to lower until its latch is in coöperative relation with its keeper, whereupon the lever may be released and the spring 17 will then act to move the locking bail into engagement with one of the teeth of the rack bar. In order to prevent too great latitude of movement of the rack bar between the bars 2 at the end of the guideway 9, a filler block 24 is secured between the said bars at a point above the upper edge of the rack bar and in order that the bars 2 may be protected against wear due to the sliding movement of the rack bar between them, a wear plate of approximately U-form and indicated by the numeral 25, may be disposed in inverted position between the bars 2 with its connecting upper portion resting against the lower end of the block 24 as clearly shown in Fig. 3 of the drawings.

It will be apparent from the foregoing that by the use of the device embodying the present invention the gate may be supported at various angles of inclination with respect to the hinge post 4 and it will further be understood by reference to Figs. 1, 4 and 5 of the drawings, that the shoulders formed by the offsets 8 in the plates 6 bearing against the edges of the bars 2 at the hinged end of the gate, serve to firmly brace the attachment of the said bolts to the rail 1, the bolts 7 being practically entirely relieved of strain. It will also be noted that the strain imposed upon the locking bail tends to draw this bail downwardly with its connecting portion firmly engaging with the teeth of the rack bar 10, thereby causing the bar to seat firmly against the upper edge of the rail 1 upon which it slides and thereby further adding to the strength of the device. Another feature of the invention resides in the fact that the gate may be tilted upwardly at its free end so as to swing over obstructions in the road surface without the necessity of moving the lever 19 or manually adjusting any of the other elements of the device.

In that form of the invention shown in Fig. 4 of the drawings, the gate is of the ordinary type and the figure illustrates the manner in which the invention may be applied to such a gate with but very slight alteration in the structure of the gate. In this type of gate one set of intermediate bars 2, indicated specifically by the numeral 26, does not extend entirely to the top of the gate but the bars comprising this set terminate at their upper ends at the lower edges of diagonal bars 27 which extend from the lower corner of the gate at its hinged end to the upper ends of the bars of the other intermediate set. In applying the device embodying the present invention to a gate of this type the rails 1 at the hinged end of the gate are cut off along a diagonal line, the corresponding end set of bars 2 having been removed, after which the bars are again secured to the rails.

In order that small live stock may be allowed to pass through the gate two or more of the lower ones of the rails 1 are cut considerably shorter than the other rails so that an opening will be formed between the intermediate sets of bars 2 above the lowermost rail 1, as indicated by the numeral 28, an auxiliary gate being provided upon the main gate for closing or partly closing this opening. A block 29 is secured between the bars of that one of the intermediate sets 2 which is located nearest the latch end of the gate and this block is located in alinement with another block 30, which is secured between the bars of the set at the said latch end of the gate. The auxiliary gate consists of rails 31 which at their inner ends are connected in space relation by means of vertically extending bars 32 which at their projecting upper and lower ends receive between them respectively the rails located above and below the opening 28 in the gate. The rails 31 are connected at their outer ends by a bar 33 secured directly to the end edges of the said rails and it will be observed by reference to Figs. 1 and 2 of the drawings that the said rails 31 extend above and below the blocks 29 and 30 with the upper rail resting slidably upon the said blocks. The auxiliary gate is in this manner supported for sliding movement and it may be slid outwardly for the purpose of letting small live stock pass through the opening 28 or it may be slid inwardly to close this opening.

In order that the auxiliary gate may be held at various positions in its sliding movement so as to permit the passage through the opening 28 of various kinds of live stock while preventing the passage of others, one rail, for example, the upper rail 31, is formed with a longitudinally extending series of openings or sockets 34, which may be brought into registration with openings 35 formed in the bars of the intermediate set which is located next adjacent the latch end of the gate and a pin 36 is adapted to be fitted through the openings 34 and 35 for the purpose stated, this pin being movably suspended by a chain or other suitable flexible element 37 secured to one of the bars of the said intermediate set. It is also preferable that the rails 31 be braced by an intermediate bar 38. In order that the bar 33 may be readily braced for the purpose of sliding the auxiliary gate toward open or closed position, the outer edges of the bars of the set 2 located at the latch end of the gate, are cut away or recessed as at 39, as is also the corresponding side of the block 30.

Having described my invention, what I claim is:

1. The combination with a gate and its hinge post, of a guide member carried by the gate and including plates secured upon opposite sides of one of the rails of the gate with their upper edges projecting above the upper edge of the said rail, a rack bar hingedly connected to the hinge post and slidably fitted between the projecting edges of the plates and upon the said edge of the rail, and a locking bail pivoted to straddle the plates and the rack bar and to coöperate with the teeth of the rack bar whereby to support the gate in various tilted adjustments.

2. The combination with a gate and its hinge post, of a guide member carried by the gate and including plates secured upon opposite sides of one of the rails of the gate with their upper edges projecting above the upper edge of the said rail, a rack bar hingedly connected to the hinge post and slidably fitted between the projecting edges of the plates and upon the said edge of the rail, a locking bail pivoted to straddle the plates and the rack bar and to coöperate with the teeth of the rack bar whereby to support the gate in various tilted positions, means yieldably holding the bail in engagement with the rack bar, a lever mounted upon the gate and connection between the lever and the bail whereby the bail may be moved out of position to coöperate with the rack bar upon movement of the lever in one direction.

3. The combination with a gate and its hinge post, the gate including rails and spaced bars secured upon opposite sides of the rails and connecting and spacing the rails, of a rack bar hingedly connected with the post and fitting slidably between the bars at the hinged end of the gate and resting upon the upper edge of one of the rails, plates secured upon opposite sides of the said rail and projecting at their upper edges above the upper edge of the rail whereby to form a guide for the rack bar, a wear member of approximately inverted U-form fitted between the said bars and straddling the rack bar, the plates having offset portions forming shoulders resting against the inner edges of the said bars, a locking bail having side portions pivoted at their lower ends to the plates and having a connecting portion engaging with the teeth of the rack bar, and means yieldably holding the bail in such engagement.

In testimony whereof I affix my signature in presence of two witnesses.

JAMES D. RODGERS. [L. S.]

Witnesses:
 SAMUEL N. ACKER,
 J. D. YOAKLEY.

Copies of this patent may be obtained for five cents each, by addressing the "Commissioner of Patents, Washington, D. C."